(12) United States Patent
Ryu et al.

(10) Patent No.: US 7,338,735 B2
(45) Date of Patent: Mar. 4, 2008

(54) ORGANIC ELECTROLYTIC SOLUTION AND LITHIUM-SULFUR BATTERY COMPRISING THE SAME

(75) Inventors: Young-Gyoon Ryu, Gyeonggi-do (KR); Myung-Dong Cho, Hwaseong-si (KR); Sang-Mock Lee, Gyeonggi-do (KR); Boris A. Trofimov, Irkutsk (RU)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 560 days.

(21) Appl. No.: 10/927,188

(22) Filed: Aug. 27, 2004

(65) Prior Publication Data
US 2005/0053842 A1    Mar. 10, 2005

(30) Foreign Application Priority Data
Sep. 5, 2003    (KR) .................. 10-2003-0062171

(51) Int. Cl.
 H01M 4/74    (2006.01)
 H01M 4/36    (2006.01)
 H01G 9/02    (2006.01)
 C07F 9/02    (2006.01)

(52) U.S. Cl. ................. 429/340; 429/326; 252/62.2; 568/13; 568/14

(58) Field of Classification Search ............. 429/340, 429/326; 252/62.2; 568/13, 14
See application file for complete search history.

(56) References Cited

U.S. PATENT DOCUMENTS 5,523,179 A    6/1996   Chu
5,532,077 A *  7/1996   Chu ...................... 429/102
5,814,420 A    9/1998   Chu
5,961,672 A   10/1999   Skotheim et al.
6,030,720 A    2/2000   Chu et al.

FOREIGN PATENT DOCUMENTS

JP         2004119260 A   *   8/2004

* cited by examiner

*Primary Examiner*—Patrick Joseph Ryan
*Assistant Examiner*—Eugenia Wang
(74) *Attorney, Agent, or Firm*—Robert E. Bushnell, Esq.

(57) ABSTRACT

An organic electrolytic solution for a lithium-sulfur battery that can improve discharge capacity and cycle life of the battery, and a lithium-sulfur battery using the organic electrolytic solution are provided. The electrolytic solution includes a lithium salt, an organic solvent, and further a phosphine sulfide-based compound represented by formula (I) below:

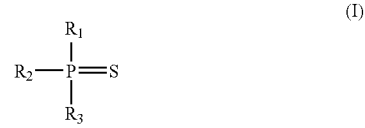

wherein $R_1$, $R_2$ and $R_3$ are the same or different from each other, and each represents one selected from the group consisting of a substituted or unsubstituted C1-C30 alkyl group, a substituted or unsubstituted C6-C30 aryl group, a substituted or unsubstituted C1-C30 alkoxy group and a substituted or unsubstituted C8-C30 aralkenyl group. The electrolytic solution including the phosphine sulfide-based compound represented by Formula (I) can suppress production of lithium sulfides so that a reduction in battery capacity can be prevented.

20 Claims, 1 Drawing Sheet

ORGANIC ELECTROLYTIC SOLUTION AND LITHIUM-SULFUR BATTERY COMPRISING THE SAME

CLAIM OF PRIORITY

This application claims all benefits accruing under 35 U.S.C. §119 from the Korean Patent Application No. 2003-62171 for ORGANIC ELECTROLYTIC SOLUTION AND LITHIUM SULFUR BATTERY COMPRISING THE SAME, filed on Sep. 5,2003, in the Korean Intellectual Property Office, the disclosure of which is incorporated herein in its entirety by reference.

BACKGROUND OF THE INVENTION

1. Field of the Invention

The present invention relates to an organic electrolytic solution and a lithium-sulfur battery comprising the same, and more particularly, to an organic electrolytic solution comprising a phosphine sulfide-based compound that can improve discharge capacity and cycle life of a lithium-sulfur battery, and a lithium-sulfur battery comprising the same.

2. Description of the Related Art

Demands for secondary batteries are increased according to rapid progress in portable electronic devices, and a battery having high energy density that can meet the present trend of light, thin, short and small dimensions in portable electronic devices is continuously required. A battery that can be cheap and safe and provide environment-affinitive aspect is required to meet such need.

The lithium-sulfur battery is most promising in energy density among the batteries that have ever been developed. The energy density of lithium is 3830 mAh/g, and the energy density of sulfur ($S_8$) is 1675 mAh/g. An active material used therein is cheap itself and environment-affinitive; however, such battery system has not been commercialized yet.

The lithium-sulfur battery cannot be commercialized because the ratio of the amount of sulfur participating in electrochemical oxidation-reduction reaction to the amount of sulfur contained within the battery is so low that the battery shows low battery capacity.

For the lithium-sulfur battery, elemental sulfur is used as an initial anode active material. As the discharge of battery proceeds, eight sulfur atoms in cyclic molecular states are changed to linear molecular states while being reduced, and finally changed to $S^{2-}$ ionic states by continued reduction. The resulting $S^{2-}$ bonds chemically to surrounding lithium cations to form lithium sulfide ($Li_2S$). Since the resulting lithium sulfide precipitates on an anode surface to reduce the activated area of the battery, and it cannot be oxidized during charging, the battery capacity is decreased. Accordingly, it is necessary to dissociate such lithium sulfide to maintain the activated area of the battery.

Approaches to solve such problems have been tried as follows. U.S. Pat. No. 6,030,720 uses the solvent including $R_1(CH_2CH_2O)_nR_2$ as a main solvent, in which n is 2 to 10, $R_1$ and $R_2$ are the same or different from each other, and represent a substituted or unsubstituted alkyl or alkoxy group, and a crown ether or a cryptand as a cosolvent. A donor or an acceptor cosolvent is included wherein the donor solvent has a donor number of at least 15. The separation distance of the battery must be 400 µm or less.

In general, the formation and precipitation of $Li_2S$ on the surface of electrodes when a lithium-sulfur battery is discharged are known as a major cause of a drop in battery capacity. Research has been conducted to increase the capacity of the lithium-sulfur battery. In most cases, ether-based solvents capable of stabilizing the lithium-sulfides are used, and an initial discharge capacity is about 840 mAh/g-sulfur, which is about 50% of the theoretical capacity. The polar solvents such as DMF, DMAc, etc. were tried to dissociate $Li_2S$, but the polar solvents vigorously react with lithium, and thus the polar solvents can not be applied to the lithium-sulfur battery system.

Also, U.S. Pat. No. 5,961,672 suggests a mixed solution of 1M $LiSO_3CF_3$ and 1,3-dioxolane/diglyme/sulfolane/dimethoxyethane (50/20/10/20) as an electrolytic solution to improve lifetime and stability of a battery by coating a polymer film on a lithium metal anode.

In U.S. Pat. No. 5,814,420, an electrode containing active materials is brought into contact with both an ion conducting material and an electron conducting material such that the active material such as activated sulfur and/or polysulfide polymer can be almost completely used.

U.S. Pat. No. 5,523,179 discloses a lithium-sulfur battery comprising an active sulfur-based material, an ion conducting material and an electron conducting material in an anode.

SUMMARY OF THE INVENTION

It is therefore an object of the present invention to provide an improved organic electrolytic solution.

It is another object of the present invention to provide an improved lithium-sulfur battery.

It is also an object of the present invention to provide an organic electrolytic solution that can improve discharge capacity and cycle life of the battery.

It is further an object of the present invention to provide a lithium-sulfur battery having improved discharge capacity and cycle life.

It is still further an object of the present invention to provide an electrolytic solution for a lithium-sulfur battery that contains an additive continuously dissociating lithium polysulfide for electrochemical reaction, thereby improving discharge capacity and cycle life of the battery, and a lithium-sulfur battery including the electrolytic solution.

In order to achieve the above and other objectives, the preferred embodiment of the electrolytic solution according to the present invention may be constructed with a lithium salt, an organic solvent, and a phosphine sulfide-based compound represented by Formula (I) below:

where $R_1$, $R_2$ and $R_3$ are independently a substituted or unsubstituted C1-C30 alkyl group, a substituted or unsubstituted C6-C30 aryl group, a substituted or unsubstituted C1-C30 alkoxy group, or a substituted or unsubstituted C8-C30 aralkenyl group.

According to another aspect of the present invention, there is provided a lithium-sulfur battery that may be constructed with an anode including at least one anode active material which may be elemental sulfur, a sulfur-based compound or mixtures thereof, a cathode including a cathode active material which may be a lithium metal, a lithium alloy, or a composite of lithium/inert sulfur, a separator interposed between the cathode and the anode to separate the cathode and the anode from each other, and an organic electrolytic solution comprising a lithium salt, an organic solvent and a phosphine sulfide-based compound represented by Formula (I) below:

where $R_1$, $R_2$ and $R_3$ are independently a substituted or unsubstituted C1-C30 alkyl group, a substituted or unsubstituted C6-C30 aryl group, a substituted or unsubstituted C1-C30 alkoxy group, or a substituted or unsubstituted C8-C30 aralkenyl group.

The organic electrolytic solution and the lithium-sulfur battery using the organic electrolytic solution according to the principles of the present invention provide improved discharge capacity and cycle life of the battery by preventing from binding a lithium metal with a sulfide such that the sulfur can participate continuously in an electrochemical reaction.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
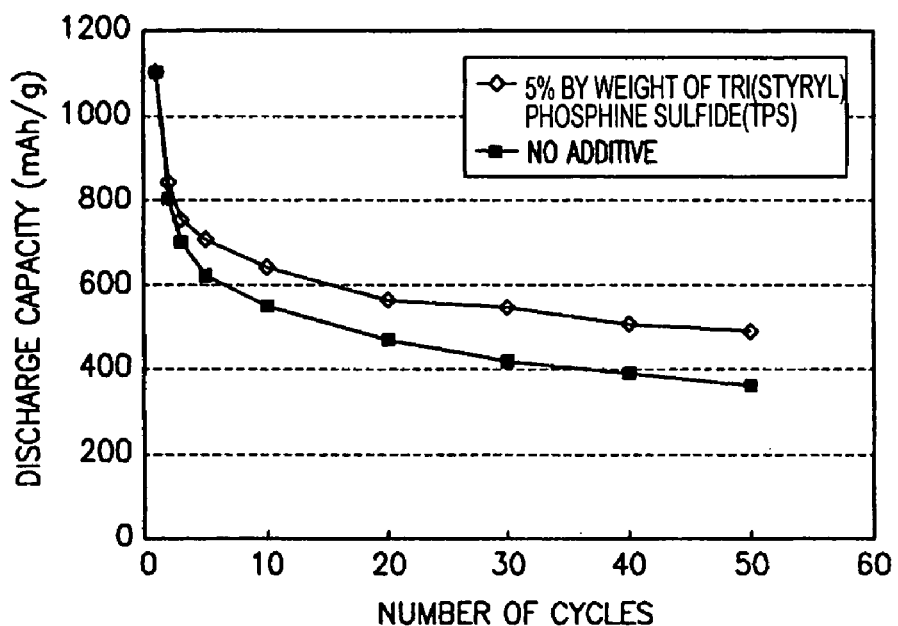
FIG. 1 is a graph illustrating discharge capacity over a range of number of cycles for the lithium-sulfur batteries according to Example 1 and Comparative Example 1.

The present invention provides an organic electrolytic solution and a lithium-sulfur battery using the organic electrolytic solution.

The term "aralkenyl group" as used herein refers to an alkenyl group in which a hydrogen atom in its double bond is substituted with an aryl group, of which the hydrogen atom can be substituted with any substituent.

According to an embodiment of the present invention, there is provided an electrolytic solution for a lithium-sulfur battery with a lithium salt, an organic solvent, and further a phosphine sulfide-based compound represented by Formula (I) below:

where $R_1$, $R_2$ and $R_3$ are independently a substituted or unsubstituted C1-C30, preferably C1-C12, and more preferably C1-C6 alkyl group, a substituted or unsubstituted C6-C30, preferably C6-C18, and more preferably C6-C12 aryl group, a substituted or unsubstituted C1-C30, preferably C1-C12, and more preferably C1-C6 alkoxy group, or a substituted or unsubstituted C8-C30, preferably C8-C18, and more preferably C8-C12 aralkenyl group.

Preferably, 0.1 to 20% by weight of the phosphine sulfide-based compound of Formula (I) can be included in the organic electrolytic solution. Less than 0.1% by weight of the compound cannot dissociate sufficiently high level of polysulfides, and more than 20% by weight of the compound can cause seriously its own degradation reaction. More preferably, 0.1 to 10%, most preferably, 0.5 to 5% by weight of the compound can be included in the organic electrolytic solution.

The phosphine sulfide-based compound of Formula (I) is preferably a tristyryl phosphine sulfide represented by Formula II below:

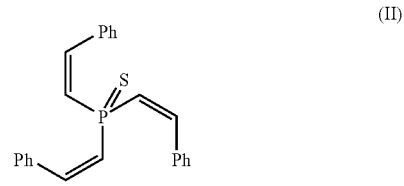

Since the phosphine sulfide-based compound represented by Formula (I) has both an anion acceptor capable of stabilizing $S^{2-}$ and a cation acceptor for lithium ions, the electrolytic solution according to the present invention can suppress production of lithium sulfides so that a reduction in battery capacity during a next discharge cycle, caused by oxidation during charging, can be prevented. That is, the phosphine sulfide-based compound according to the present invention bonds to and coordinates with $S^{2-}$ or $LiS^-$ in lithium sulfide, thereby suppressing the ion's bonding to a lithium ion, and thus increases stability of the sulfide anion. Also, the sulfur of Formula (I) functions as a cation acceptor which bonds to a lithium ion, and thus the bonding of the sulfide anion with the lithium ion is suppressed. The reaction scheme of tristyryl phosphine sulfide of Formula (II) is shown below, Reaction scheme I

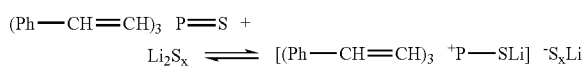

Hereinafter, the lithium-sulfur battery according to the present invention is described.

The lithium-sulfur battery according to the present invention may be constructed with an anode including at least one anode active material such as elemental sulfur, a sulfur-based compound and mixtures thereof, a cathode comprising at least one cathode active material such as a lithium metal, a lithium alloy and a composite of lithium/inert sulfur, a separator interposed between the cathode and the anode to separate the cathode and the anode from each other, and an organic electrolytic solution comprising a lithium salt, an organic solvent and a phosphine sulfide-based compound represented by Formula (I).

The cathode active material can be a lithium metal, a lithium alloy or a composite of lithium metal/inert sulfur, and the anode active material can be at least one of elemental sulfur, $Li_2S_n$ where $n \geq 1$, a catholyte in which $Li_2S_n$, where $n \geq 1$, is dissolved, an organosulfur compound, and a carbon-sulfur polymer $((C_2S_x)_n)$ where x=2.5 to 50, and $n \geq 2$.

The lithium salt used in the electrolytic solution can be $LiPF_6$, $LiSO_3CF_3$, $LiN(SO_2CF_3)_2$, $LiClO_4$, $LiBF_4$, $LiAsF_6$, $LiC(CF_3SO_2)_3$, $LiN(C_2F_5SO_2)_2$, $LiN(CF_3SO_2)_2$ or a combination thereof.

The organic solvent used in the electrolytic solution according to the present invention can be any organic solvent used in conventional lithium-sulfur batteries. Examples of the organic solvent include an oligoether-based compound such as tetrahydrofuran, 2-methyl tetrahydrofuran, 1,3-dioxolane, 4-methyl-1,3-dioxolane, etc., an ester carbonate-based compound such as dimethyl carbonate, diethyl carbonate, dipropyl carbonate, methylethyl carbonate, methylpropyl carbonate, etc., an alkyl ester-based compound such as methyl formate, methyl acetate, methyl propionate, etc., an aromatic nitrile-based compound, an amide-based compound, a lactone-based compound such as butyl lactone, and a sulfur-based compound. The solvent can be used alone or in combination of at least two solvents.

The electrolytic solution can further comprise an electron conducting material such that an electron can move smoothly in an anode plate. The electron conducting material can be, but is not limited to, a carbon black, a graphite, a carbon fiber, an electron conducting compound having a conjugated carbon-carbon double bond and/or a carbon-nitrogen double bond, for example, an electron conducting polymer such as polyaniline, polythiophene, polyacetylene, polypyrrole, etc. and mixtures thereof.

The anode active material is attached to a current collector by a binder. The binder can be polyvinyl acetate, polyvinyl alcohol, polyethylene oxide, polyvinyl pyrrolidone, alkylated polyethylene oxide, crosslinked polyethylene oxide, polyvinyl ether, polymethyl methacrylate, polyvinyhdene fluoride, copolymer of polyhexafluoropropylene and polyvinylidene fluoride, polyethyl acrylate, polytetrafluoroethylene, polyvinyl chloride, polyacrylonitrile, polyvinyl pyridine, polystyrene, and derivatives, mixtures or copolymers thereof.

The separator can be any one generally used in a lithium battery. A rollable separator such as polyethylene(PE), polypropylene(PP) film, etc. can be used, or a separator that is prepared by coating a gelated polymer on top of the PE or PP film, or infusing a composition comprising a polymerizable monomer for forming a gelated polymer into the battery, then polymerizing it to form the gelated polymer layer on a PE or PP film can be used.

The lithium-sulfur battery using the organic electrolytic solution according to the present invention is prepared as follows.

First, an anode active material composition is prepared by mixing an anode active material, a conducting material, a binder and a solvent. An anode plate is prepared by direct-coating the anode active material composition on an aluminum current collector and drying the coated anode plate. Alternatively, an anode plate can be prepared by casting the anode active material composition on a separate support, and then laminating the film obtained by delaminating from the support, on the aluminum current collector. The support can be a polyester film such as a MYLAR™ film, etc.

A lithium metal plate, a sodium metal plate, a lithium alloy plate or a sodium alloy plate, etc. is used as a cathode after cutting to a desired size. A current collecting plate composed of a conducting metal plate such as copper plate can be laminated on the cathode.

An electrode assembly is prepared by interposing a separator between the cathode plate and the anode plate. A lithium-sulfur battery is completed by winding or folding the electrode assembly and putting it in a cylindrical battery case or a prismatic type case, and then infusing the organic electrolytic solution according to the present invention thereto.

The present invention will be described in greater detail with reference to the following examples. The following examples are for illustrative purposes and are not intended to limit the scope of the invention.

EXAMPLES

Example 1

Elemental sulfur (80% by weight), a polymer binder (styrenebutadiene rubber, 15% by weight) and a carbon black conducting material (5% by weight) were mixed and coated on an aluminum film, and the coated product was used as an anode. Lithium metal having a thickness of 150 microns was used as a cathode. 25 microns of a PE/PP/PE separator obtained from Asahi Company was used as a separator. The organic electrolytic solution contains 5% by weight of tristyrylphosphine sulfide and 2M $LiN(SO_2CF_3)_2$ in dimethoxyethane(DME)/dioxolane(DOX) (1:1 by volume). A battery was assembled from the cathode, the anode and the organic electrolyte, and a charge-discharge test was performed using the battery. The results are shown in FIG. 1.

Examples 2 and 3

Figure 2:
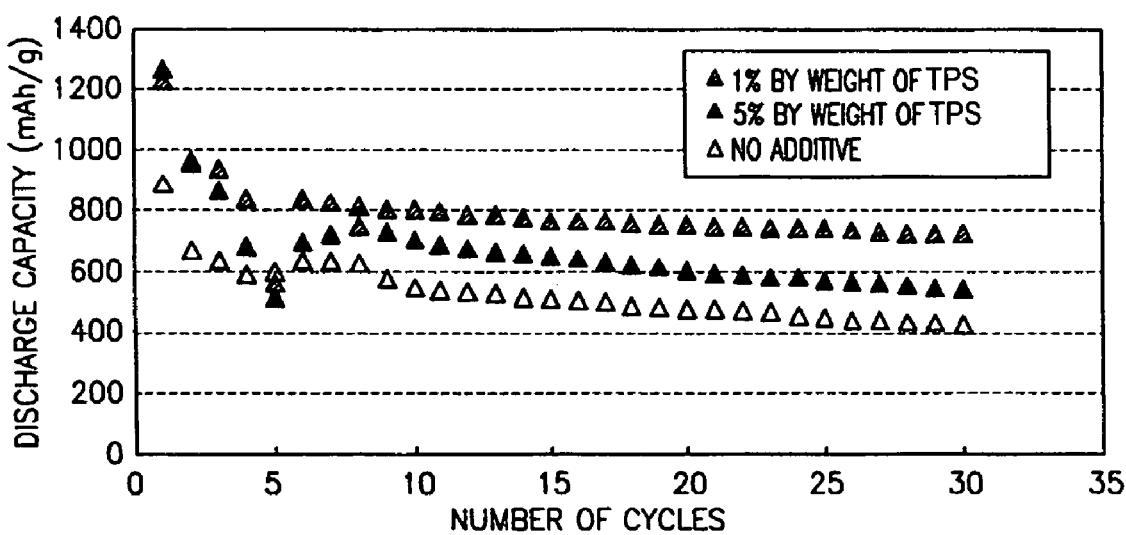
FIG. 2 is a graph illustrating the discharge capacity over a range of number of cycles for the lithium-sulfur batteries of Example 2 and 3, and Comparative Example 2.

Lithium-sulfur batteries were assembled according to the same method as in Example 1, except that the organic electrolytic solutions contain 1.0% by weight (Example 2) and 5.0% by weight (Example 3) of tristyrylphosphine sulfides, respectively, and 1M $LiSO_3CF_3$ in DME/DGM/DOX (2:4:1 by volume). The charge-discharge test was performed. The results are shown in FIG. 2.

Comparative Example 1

A lithium-sulfur battery was assembled according to the same method as in Example 1, except that the tristyrylphosphine sulfide was not added to the electrolytic solution. The charge-discharge test was performed. The results are shown in FIG. 1.

Comparative Example 2

A lithium-sulfur battery was assembled according to the same method used in Example 2, except that the tristyrylphosphine sulfide was not added to the electrolytic solution. The charge-discharge test was performed. The results are shown in FIG. 2.

Charge-Discharge Test

A charge-discharge test was performed about the lithium-sulfur battery prepared in the examples and the comparative examples.

The charge-discharge test was performed by discharging the battery with a discharge current density of 1.2 mA/cm$^2$, and carrying out by one cycle varying discharge current to 1.2, 2.4, 6 and 12 mA at a fixed charge current density of 2.4 mA/cm², and then carrying out 100 cycles of charge-discharge at a discharge current density of 6 mA/cm². The cut-off voltage during the charge-discharge was 1.5 to 2.8V.

FIG. 1 is a graph illustrating the discharge capacity according to number of cycles for the lithium-sulfur batteries according to Example 1 and Comparative Example 1.

FIG. 2 is a graph illustrating the discharge capacity according to number of cycles for the lithium-sulfur batteries of Example 2 and 3, and Comparative Example 2.

As can be seen in FIGS. 1 and 2, when the organic electrolytic solution includes tristyrylphosphine sulfide, the lithium-sulfur secondary battery has a higher discharge capacity and a longer lifetime.

Therefore, the electrolytic solution including the phosphine sulfide-based compound of Formula (I) improves the cycle life of batteries and is more effective since the phosphine sulfide-based compound does not react readily with lithium metal unlike conventional $Li_2S$ dissociating materials.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrolytic solution for a lithium-sulfur battery, comprising:
   a lithium salt;
   an organic solvent; and
   a phosphine sulfide-based compound represented by Formula (I):

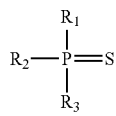

(I)

wherein $R_1$, $R_2$ and $R_3$ are independently selected from the group consisting of a substituted or unsubstituted C1-C30 alkyl group, a substituted or unsubstituted C6-C30 aryl group, a substituted or unsubstituted C1-C30 alkoxy group and a substituted or unsubstituted C8-C30 aralkenyl group.

2. The electrolytic solution of claim 1, wherein an amount of the phosphine sulfide-based compound is 0.1 to 20% by weight based on the weight of the electrolytic solution.

3. The electrolytic solution of claim 1, wherein an amount of the phosphine sulfide-based compound is 0.1 to 5% by weight based on the weight of the electrolytic solution.

4. The electrolytic solution of claim 1, wherein the phosphine sulfide-based compound of said Formula (I) is tristyrylphosphine sulfide.

5. The electrolytic solution of claim 1, wherein $R_1$, $R_2$ and $R_3$ of Formula (I) are independently selected from the group consisting of a substituted or unsubstituted C1-C12, alkyl group, a substituted or unsubstituted C6-C18 aryl group, a substituted or unsubstituted C1-C12 alkoxy group, and a substituted or unsubstituted C8-C18 aralkenyl group.

6. The electrolytic solution of claim 1, wherein $R_1$, $R_2$ and $R_3$ of Formula (I) are independently selected from the group consisting of a substituted or unsubstituted C1-C6 alkyl group, a substituted or unsubstituted C6-C12 aryl group, a substituted or unsubstituted C1-C6 alkoxy group, and a substituted or unsubstituted C8-C12 aralkenyl group.

7. The electrolytic solution of claim 1, further comprising an electron conducting material.

8. The electrolytic solution of claim 7, wherein the electron conducting material is selected from the group consisting of a carbon black, a graphite, a carbon fiber, an electron conducting compound having at least one of a conjugated carbon-carbon double bond and a carbon-nitrogen double bond, and mixtures thereof.

9. The lithium-sulfur battery comprising a cathode, an anode, a separator interposed between said cathode and said anode, and the electrolytic solution of claim 1.

10. A lithium-sulfur battery, comprising:
    an anode including at least one anode active material;
    a cathode including at least one cathode active material;
    a separator interposed between the cathode and the anode to separate the cathode and the anode from each other; and
    an organic electrolytic solution comprising a lithium salt, an organic solvent and a phosphine sulfide-based compound represented by Formula (I):

(I)

wherein $R_1$, $R_2$ and $R_3$ are independently selected from the group consisting of a substituted or unsubstituted C1-C30 alkyl group, a substituted or unsubstituted C6-C30 aryl group, a substituted or unsubstituted C1-C30 alkoxy group and a substituted or unsubstituted C8-C30 aralkenyl group.

11. The lithium-sulfur battery of claim 10, wherein an amount of the phosphine sulfide-based compound is 0.1 to 20% by weight based on the weight of the electrolytic solution.

12. The lithium-sulfur battery of claim 10, wherein the compound of said Formula (I) is tristyrylphosphine sulfide.

13. The lithium-sulfur battery of claim 10, wherein the anode active material is selected from the group consisting of elemental sulfur, $Li_2S_n$ where $n \geq 1$, a catholyte in which $Li_2S_n$, where $n \geq 1$, is dissolved, an organosulfur compound, a carbon-sulfur polymer represented by Formula $(C_2S_x)_n$ where $x=2.5$ to 50 and $n \geq 2$, a sulfur-based compound, and a combination thereof.

14. The lithium-sulfur battery of claim 10, wherein the cathode active material is selected from the group consisting of a lithium metal, a lithium alloy and a composite of lithium/inert sulfur.

15. The lithium-sulfur battery of claim 10, wherein the lithium salt is selected from the group consisting of $LiPF_6$, $LiSO_3CF_3$, $LiN(SO_2CF_3)_2$, $LiClO_4$, $LiBF_4$, $LiAsF_6$, $LiC(CF_3SO_2)_3$, $LiN(C_2F_5SO_2)_2$, $LiN(CF_3SO_2)_2$ and a combination thereof.

16. The lithium-sulfur battery of claim 10, wherein the organic solvent is selected from the group consisting of an oligoether-based compound, an ester carbonate-based compound, an alkyl ester-based compound, an aromatic nitrile-based compound, an amide-based compound, a lactone-based compound, a sulfur-based compound, and a combination thereof.

17. The lithium-sulfur battery of claim 16, wherein the organic solvent is selected from the group consisting of tetrahydrofuran, 2-methyl tetrahydrofuran, 1,3-dioxolane, 4-methyl-1,3-dioxolane, dimethyl carbonate, diethyl carbonate, dipropyl carbonate, methylethyl carbonate, methylpropyl carbonate, methyl formate, methyl acetate, methyl propionate, butyl lactone, and a combination thereof.

18. The lithium-sulfur battery of claim 10, wherein the organic electrolytic solution further comprises an electron conducting material.

19. The lithium-sulfur battery of claim 18, wherein the electron conducting material is selected from the group consisting of a carbon black, a graphite, a carbon fiber, an electron conducting compound having at least one of a conjugate carbon-carbon double bond and a carbon-nitrogen double bond, and mixtures thereof.

20. A lithium-sulfur battery, comprising:
an anode comprising at least one anode active material selected from the group consisting of elemental sulfur, $Li_2S_n$ where $n \geq 1$, a catholyte in which $Li_2S_n$, where $n \geq 1$, is dissolved, an organosulfur compound, a carbon-sulfur polymer represented by Formula $(C_2S_x)_n$ where $x=2.5$ to 50 and $n \geq 2$, a sulfur-based compound, and a combination thereof;
a cathode comprising at least one cathode active material selected from the group consisting of a lithium metal, a lithium alloy and a composite of lithium/inert sulfur;
a separator interposed between the cathode and the anode to separate the cathode and the anode from each other; and
an electrolytic solution comprising:
a lithium salt;
an organic solvent;
a phosphine sulfide-based compound in a percentage by weight from 0.1 to 20% based on the weight of the electrolytic solution, the phosphine sulfur-based compound represented by Formula (I):

(I)

wherein $R_1$, $R_2$ and $R_3$ are independently selected from the group consisting of a substituted or unsubstituted C1-C30 alkyl group, a substituted or unsubstituted C6-C30 aryl group, a substituted or unsubstituted C1-C30 alkoxy group and a substituted or unsubstituted C8-C30 aralkenyl group; and
optionally an electron conducting material.

* * * * *